Figures 1, 6:
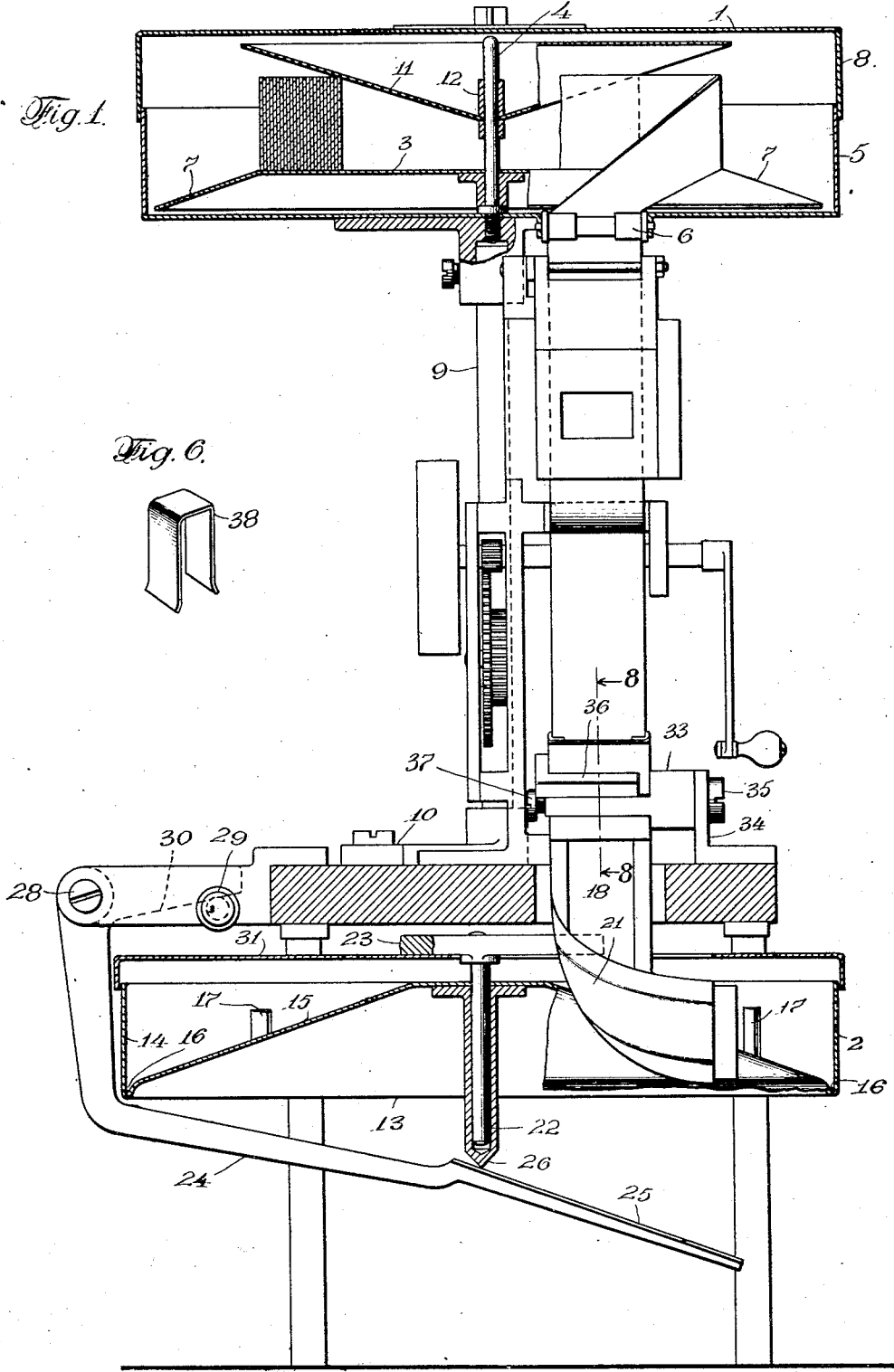

G. W. BINGHAM.
MOVING PICTURE MACHINE.
APPLICATION FILED MAR. 30, 1910.

1,134,664.

Patented Apr. 6, 1915.

3 SHEETS—SHEET 1.

Witnesses:
Philip S. McLean.
Teresa V. Lynch.

Inventor
George W. Bingham
By his Attorneys
Brock Becker & Smith

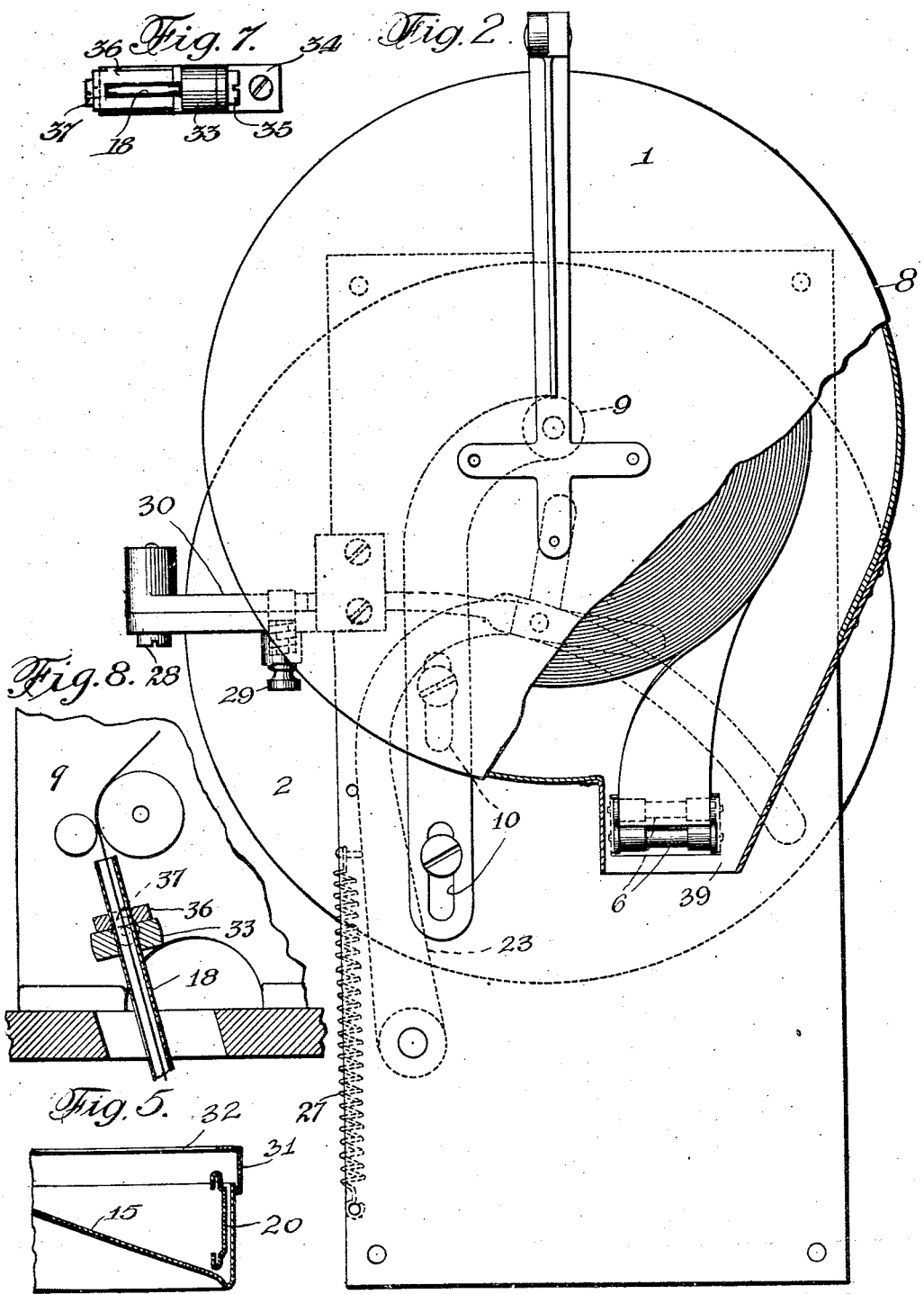

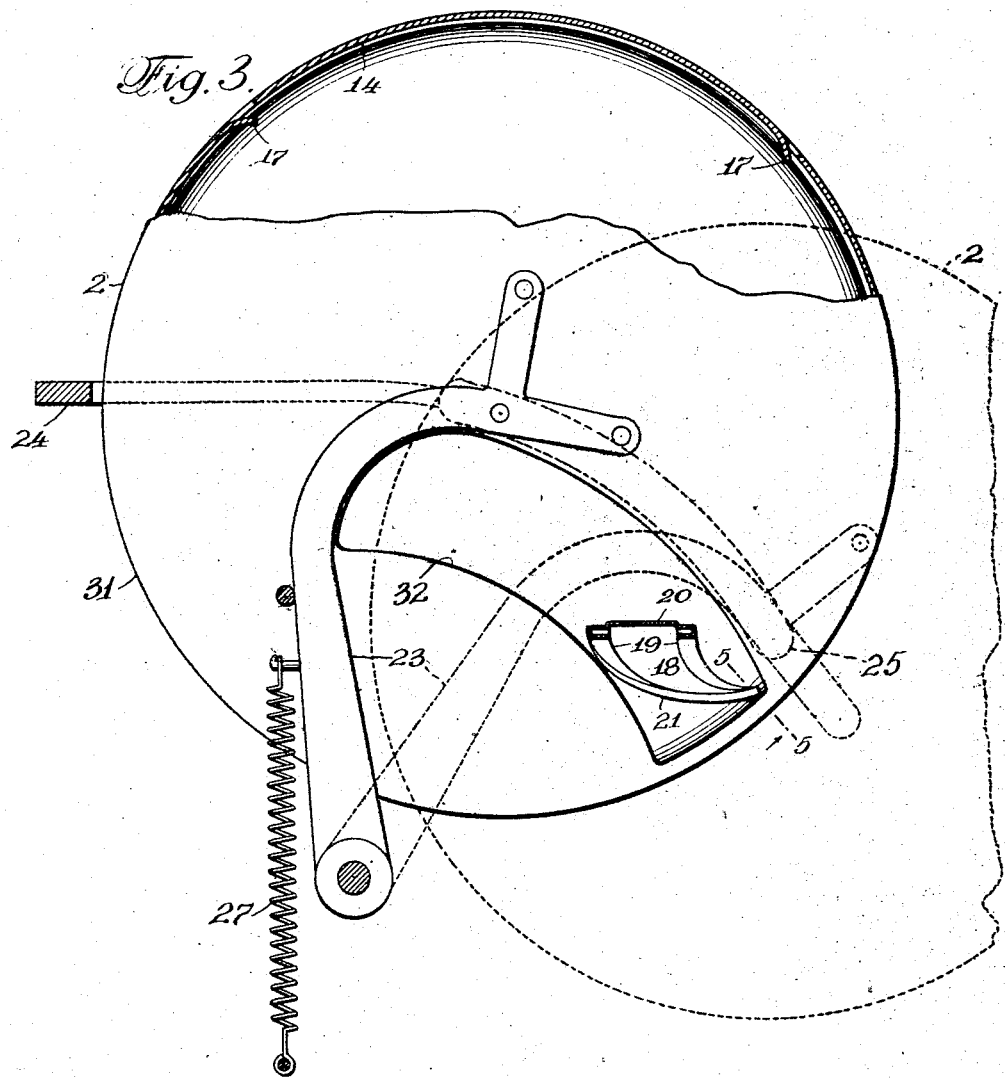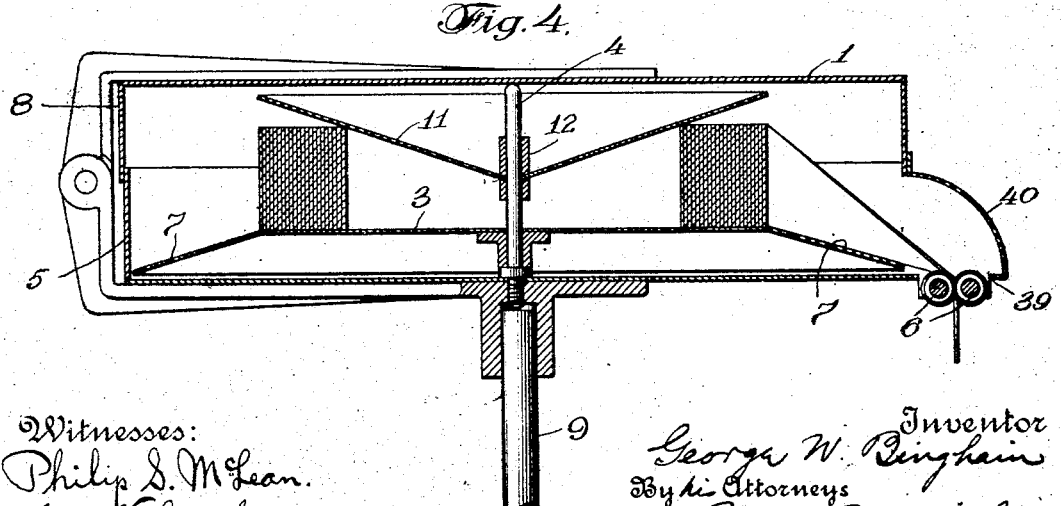

UNITED STATES PATENT OFFICE.

GEORGE W. BINGHAM, OF BROOKLYN, NEW YORK, ASSIGNOR TO THE BINGHAM
MANUFACTURING COMPANY, A CORPORATION OF MAINE.

MOVING-PICTURE MACHINE.

1,134,664.  Specification of Letters Patent.  Patented Apr. 6, 1915.

Application filed March 30, 1910. Serial No. 552,346.

*To all whom it may concern:*

Be it known that I, GEORGE W. BINGHAM, a citizen of the United States, and a resident of borough of Brooklyn, in the county of Kings and State of New York, have invented certain new and useful Improvements in Moving-Picture Machines, of which the following is a specification.

My invention relates to improvements in moving picture machines, and in particular to the film handling mechanism thereof.

In a prior application filed May 17, 1909, Serial No. 496,512, of mine I have already disclosed and claimed a method of and a machine for handling the film in such a way that the used portion of the film, after being passed through the machine, is rewound with the leading end outward, so that the film may be used again, directly, without the customary necessity for rewinding the film.

The present invention is an improvement on this former machine and is designed more particularly for the handling of long films, (in thousand feet lengths—more or less).
In coiling and uncoiling, the film, unless it is properly held at all points, has a tendency to buckle, twist and curl, and this tendency is of course magnified in proportion to the length of the film.

The principal object of my invention is to properly control the movement of the film and to prevent curling and twisting of the same.

Broadly, the invention consists in feeding the film from a film support to a film receiver, coiling the film within the receiver, and in providing means for so holding the film as to cause it to coil itself in regular formation in the receiver.

The receiver for the film preferably consists of a rotary member within which the film is coiled, (and this rotary member may conveniently receive its rotary motion from the coiling impulse of the film within the member), while the means for holding the film during the coiling thereof is preferably in the form of an inclined bottom to the receiver, which causes the film as it is wound therein, to gravitate toward the rim or inner periphery of the member and form a compact coil resting against the rim of the receiver.

Another feature of my invention is a guide for directing the film into the edge portion of the receiver so as to assist in coiling the film within the same. In order to allow for the increased size of the film roll as it is wound in the receiver, the guide and the receiver are movably related one with respect to the other, and to secure a constant coiling efficiency of the guide, I provide means for maintaining a constant relation between the mouth of the guide and the inclined bottom of the receiver.

Further features of the invention comprise a novel holding device on the inner wall of the receiver, adapted to be engaged by the leading end of the film, and a novel form of clasp, adapted, in case the film breaks, to hold the loose broken end of the film.

Other features of the invention will appear as the specification proceeds.

In the accompanying drawings there is illustrated a preferred embodiment of my invention, but it will of course be understood that various changes and modifications may be made therein without departing from the spirit and scope of the invention. Also the various features of the invention are not necessarily limited to a moving picture machine, but may be used wherever found practicable.

In the drawings: Figure 1, is a partly sectional front elevation of my invention as applied to a moving picture machine. In this view, both the film support at the top, and the film receiver at the bottom, are shown in section. Fig. 2, is a top plan view of the invention with the cover to the film support broken away and the wall of the casing shown in section. Fig. 3, is a plan view of the film receiver and supporting means therefor, certain of the parts being broken away and shown in section. Fig. 4, is a cross-sectional view of the film support. Fig. 5, is a detail sectional view taken on the line 5—5 of Fig. 3, to illustrate the initial feeding relation of the guide and film receiver. Fig. 6, is a detail view of a clip which I may use for securing a broken end on the film in the receiver. Fig. 7 is a plan view of the adjustable support for the guide, looking downward on the same as it appears in Fig. 1. Fig. 8 is a longitudinal sectional view of the film guide and the support for the same, taken on line 8—8 of Fig. 1. For the sake of clearness the lines indicating the reduced edge portion of the film guide or chute have been omitted from this figure.

Like reference characters denote corresponding parts throughout the several views.

In practice, the film is usually led from the roll of film in the film support down, through the machine, to a receiver within which the film is rewound, both the support and the receiver being "passive", and receiving their respective unwinding and rewinding motions from the feeding movement of the film. As to certain of the features of the invention, however, it is immaterial whether the film support and receiver be merely passive or receive motion from some external source, and the invention is to be construed accordingly.

The film supporting member, as a whole, is designated 1, and the receiver, 2. The film support preferably consists of a supporting disk 3, which is rotatively engaged on a spindle 4, and the disk is preferably inclosed within a casing 5. The roll of film is placed upon the disk and the end is fed through a guide (which may be a pair of rollers 6) down through the mechanism by which the intermittent feeding motion is imparted to the film. In order to allow the film to freely run off the edge of the disk and to assist in centering the roll with respect to the disk, said disk is preferably provided with downwardly directed edge portions 7, which may be either curved or angular, as desired. The casing is preferably provided with a hinged cover 8, to permit the placing of the film roll on the disk. The film support is preferably mounted on a standard or support 9, independent of the machine so that the machine may be independently removed, or the film support may be applied to any machine, but if desired, the film support may be carried by the machine proper. In order to permit of a certain amount of adjustment of the film support with respect to the machine, the base of the standard 9, is preferably fastened on the table or stand as by means of a slotted connection 10.

The film roll when it is placed in the film support may be more or less irregular in shape, and therefore, if no other means were provided, the film might uncoil irregularly from the roll. In order then to properly hold the film roll upon the disk and to center the same with respect to the disk, I preferably provide a spreader or spreading device which is adapted to engage the inner part of the film roll so as to hold the same distended in the shape of a substantially true circle. In its preferred form this spreader consists of an inverted cone-shaped disk 11, the inclined face of which rests upon the inner convolutions of the coil. This spreader may be centered upon the spindle by means of a bushing 12. It will be understood that the spreader simply rests upon the inside of the coil and rotates with the coil.

The receiver for the used portion of the film is preferably in the form of a circular shell 13, provided with an upstanding annular rim 14, and the means for holding the film within the receiver so as to cause the film to be coiled regularly within the same, is preferably in the form of a conical bottom 15 to the receiver, inclined from the center toward the rim thereof. In addition to the inclined bottom, the receiver is preferably formed with an annular depression or "gutter" 16, located at the base of the upstanding rim. In operation, the used portion of the film after being passed through the machine is directed into the receiver and against the inner periphery thereof, so that as the film is fed into the receiver it is coiled progressively toward the center of the receiver and with the leading end of the film outward. The receiver is preferably loosely journaled so as to receive its rotary motion merely from the feeding impulse of the film. The leading end of the film is guided into the receiver so as to engage against the inner periphery thereof and to rest in the annular depression aforesaid, which depression serves to hold the first convolution or so, of the film, outward in engagement with the wall of the receiver. Then as the succeeding convolutions of the film are fed into the receiver the inclined supporting surfaces cause the coils to gravitate toward the rim of the receiver. In this way it will be understood that the film is wound in the receiver in a compact coil resting against the annular rim thereof. This conical bottom also prevents the film from curling or twisting, and causes the film to be wound in a regular coil. To further assist in holding the leading end of the film outward in engagement with the rim of the receiver, I may provided either one or a series of clips or holding devices 17, which may be carried by the rim of the receiver. I have shown these holding devices in the form of wings struck inward from the material of the rim.

Some guiding means are necessary for properly directing the film within the receiver and for this purpose I preferably use a guide in the form of an open chute 18, having the edges thereof turned inward as at 19, so as to inclose only the edge portions of the film strip. Also the bottom portion of the guide, or that portion between the inturned edges thereof, is preferably depressed below the plane of the said edge portions as at 20, so that by this construction the film is guided merely by engaging the perforated edge portions thereof and without touching the effective or picture-carrying portion.

Both the film support and the receiver are preferably journaled so as to rotate in a horizontal plane, but it will be understood that other arrangements than this may be employed, if found desirable. When the receiver is thus journaled to rotate horizontally, the guide has to be of such shape as to direct the film from a substantially vertical plane (as it issues from the machine proper) to a substantially horizontal plane at the point where it is directed into the receiver. This may be done by giving the guide a bodily twist, substantially as indicated at 21.

Initially, the guide and the rim of the receiver are disposed closely adjacent each other so that the leading end of the film will be brought into close engagement with the rim of the receiver. As the roll of film within the receiver increases in size, however, the guide or the receiver must yield one with respect to the other so as to allow for this increase in the size of the film roll. This relative movement between the guide and receiver is accomplished preferably by engaging the receiver on a pintle 22, carried on the end of a swinging arm 23. This swinging arm permits the receiver to have a radial movement toward and away from the guide. It is essential for the greatest efficiency of the guide that the mouth of the guide be at all times closely adjacent to the bottom of the receiver and on account of the conical shape of the bottom, some means are necessary for compensating for the gradual incline of the bottom. In the present instance this compensating means acts to lower the receiver with respect to the guide at a rate proportionate to the movement of the receiver with respect to the guide. The same result, however, might be obtained by raising the mouth of the guide. The compensating means is here shown in the form of a supporting arm 24, having an inclined bearing surface 25, corresponding in angle to the inclined bottom of the receiver. The receiver is provided with a central bearing point 26 which rides upon this inclined surface. There is also preferably provided a spring 27, or equivalent means for normally holding the receiver up at the top of the incline in the initial feeding position (with the mouth of the guide in close relation to the inner periphery of the receiver).

In operation, as the film roll in the receiver increases in thickness, the receiver rides down over the inclined support in proportion to the radial movement of the receiver so as to maintain the bottom of the receiver always in a predetermined close relation with respect to the mouth of the guide. When the film roll is to be removed from the receiver, the receiver may be lowered to disengage it from the pintle by lowering the inclined support upon which the receiver rides. To allow for this movement, the inclined support may be pivoted at the point 28 so as to swing downward, and may be held in its uppermost position by means of a spring-pressed pin 29, engaging under the portion 30, of the supporting arm, so that when said pin is withdrawn, the arm will drop down. The receiver also is preferably provided with a cover 31. This cover may be carried by the swinging arm and it is provided with a radial slot 32, therein, to permit the passage of the guide and to allow for the radial movement of the receiver with respect to the guide. In order to hold the film properly coiled within the receiver in case it should break midlength, I preferably provide a spring clip 38 (Fig. 6) which is simply inserted over the main body of the film and the broken end thereof, to hold the coil in regular shape. If then the film should break midlength while it is being exhibited, this clip would be clamped over the broken end of the film and the remainder of the film would then be fed forward in the regular manner. In order to permit of a certain adjustment of the guide with respect to the machine and to the receiver, the said guide is preferably clamped in a holder 33, which is rotatively engaged on a bracket 34, as by means of a securing screw 35. The guide may be adjustably clamped within the holder by means of a sliding clamping member 36, which is clamped up against the guide by means of a securing screw 37.

It will be understood that this invention may be adapted either to the camera for taking the pictures, or to the projecting apparatus for exhibiting the same.

As a convenient means of support for the guide rolls 6, the bottom of the film support casing is preferably provided with a tongue or forward extension 39 (Figs. 2 and 4) in which the rolls are journaled, and a nose or extension 40 on the cover serves to inclose the guide rolls.

What is claimed, is:

1. The combination of a horizontally disposed rotatable receiver having a bottom which slopes downward toward the outer periphery thereof, supporting means for the receiver, means for winding a roll of flexible material into the said receiver with the leading end out and from the outside progressively inward toward the center, and means for automatically lowering the receiver as the flexible material is wound in the receiver so that the flexible material will always be presented to the same point vertically in the receiver notwithstanding its sloping bottom.

2. In a moving picture machine, a freely rotatable film receiver adapted to receive its motion from the winding motion of the film therein and provided with means for holding the film during the winding thereof outward against the inner periphery of the receiver, and a stationary guide for directing the film into the edge portion of the receiver, the said receiver having a movement with respect to the guide to allow for the increase in size of the film roll as it is wound in the receiver.

3. In a moving picture machine, a film receiver having its bottom inclined from the center toward the periphery thereof so as to hold the film as it is coiled therein outward in close engagement with the inner periphery of the receiver, a supporting means for the receiver, a guide for directing the film into the edge portion of the receiver, the said guide and receiver having a relative movement one with respect to the other to allow for the increase in size of the film roll as it is wound in the receiver, and means for maintaining a constant relation between the mouth of the guide and the inclined bottom of the receiver during the relative movement of the guide and receiver.

4. In a moving picture machine, a film receiver freely rotatable to respond to the winding motion of a coil of film, a stationary and rigid guide, means for directing the leading end of the film into the receiver, and means for holding the film as it is coiled in the receiver, outward toward the rim of the receiver.

5. In a moving picture machine, feeding means for imparting motion to the film, a film receiver having an annular rim and freely rotatable to respond to the feeding motion of the film, a rigid guiding means for directing the leading end of the film against the rim of the receiver, whereby the film is coiled progressively inward, with the leading end on the outside, and means for holding the film as it is coiled in the receiver, outward against the rim of the receiver.

6. In combination, means engaging a roll of tape of flexible material for imparting a feeding motion thereto, a supporting member for said roll, a loosely mounted receiving member into which the tape winds itself, a guide for directing the film into the receiver so that the receiver will respond to the motion of the tape as it rewinds, and means for holding the tape during the rewinding thereof, outward against the inner periphery of the receiving member.

7. In combination with a supporting member for a roll of flexible tape, a receiver for the tape, means adapted to feed the tape into the receiver, the said receiver being loosely mounted so as to receive motion from the feeding action of the tape and to thereby coil the tape within the receiver, and means for holding the tape while it is being coiled in the receiver, outward against the inner periphery thereof.

8. A supporting member adapted to support a roll of flexible tape, a passive receiving member, driving means for engaging the tape to impart a feeding movement thereto from the supporting to the receiving member, a rigid guide for directing the tape into the receiver and means provided by the receiver for holding the tape as it is coiled therein, outward against the inner periphery of said receiving member.

9. The combination with a supporting member and a rotatable receiver, means for conveying a flexible tape from the supporting member to the receiver, a stationary guide for coiling the tape within the receiver, the said receiver and guide having a relatively radial movement one with respect to the other so as to coil the tape from the outer portion toward the center of the receiver, and means for forcing the tape as it is coiled within the receiver, outward against the inner periphery of the receiver.

10. In combination, a film support, a rotatable film receiver, means engaging the film to impart a feeding movement thereto, a rigid and stationary guide for directing and coiling the film within the receiver, the said receiver and guide having a movement one with respect to the other to permit coiling action of the film within the receiver, and means for holding the film outward against the inner periphery of the receiver as it is coiled within said receiver.

11. In a moving picture machine, the combination of a relatively stationary guiding means, a film receiver mounted to be rotated idly around its own axis and to oscillate idly with reference to the guiding means on a center outside of its axis of rotation, means for moving a film through said guiding means substantially radially into the receiver so as to engage the wall thereof, the film receiver being rotated by the impulse from the moving film, whereby the film is wound in the receiver inward from the center thereof and with its leading end out, and means for forcing the film as it is wound in the receiver, outward against the wall of the same.

12. In combination with a moving picture machine, film feeding mechanism comprising a support for the unused portion of the film, a receiver for the used portion of the film mounted to rotate freely upon its own axis, means for guiding the film into the receiver from the feeding mechanism whereby the contact of the film with the receiver will cause the receiver to rotate and the film to be coiled within the receiver with the leading end out, and means for forcing the film outward against the inner periphery of the receiver so as to coil the film in a compact mass resting against the inner periphery of the receiver.

13. In combination, a film support, means for imparting feeding motion to the film, and a freely rotatable film receiver having a conical bottom to direct the film toward the rim portion thereof, and means for automatically lowering the receiver as the film is wound therein upon said conical bottom.

14. In a moving picture machine, guiding means for the film, a receiver adapted to receive the film from the guiding means and having a bodily movement toward and away from said guiding means, the said film receiver having a bottom slanting from the center toward the rim thereof, and means for maintaining a predetermined relation between the guide and the slanting bottom of the receiver during the bodily movement of the receiver.

15. In a moving picture machine, a rotatable film receiver having a conical bottom, a support for the receiver, a guide for directing the film into the said receiver, the said guide and receiver having a relatively radial movement one with respect to the other, and means for maintaining a predetermined relation between the guide and inclined bottom during the radial movement aforesaid.

16. In combination, a film receiver having an inclined bottom, a guide for directing the film into said receiver, a support for the receiver permitting the receiver to have a movement toward and away from the guide, and means for maintaining the inclined bottom of the receiver closely adjacent to the mouth of the guide during the forward movement of the receiver.

17. In combination, a swinging arm, a film receiver rotatively engaged on the end of said swinging arm, a member upon which the receiver rides during the swinging movement thereof whereby the receiver is raised and lowered, and a guide for directing the film into the receiver.

18. In combination, a swinging arm, a film receiver rotatively engaged on the end of said swinging arm and provided with a bottom inclined toward the rim portion thereof, means to direct the film into the receiver and an inclined supporting member upon which the receiver rides during the swinging movement thereof.

19. In combination, a swinging arm, a film receiver rotatively engaged on the end of said swinging arm and provided with a bottom inclined toward the rim portion thereof, an inclined supporting member upon which the receiver rides during the swinging movement thereof, and means for guiding the film into the receiver.

20. In combination, a swinging arm, a film receiver rotatively engaged on the end of said swinging arm and provided with a bottom inclined toward the rim portion thereof, means to direct the film into the receiver, an inclined supporting member upon which the receiver rides during the swinging movement thereof, and means tending to normally hold the receiver at the upper portion of the inclined supporting member.

21. In combination, a swinging arm provided with a pintle, a film receiver journaled to rotate on said pintle and provided with an inclined bottom, a support on which the film receiver is adapted to ride during the swinging movement thereof, said support arranged on an incline corresponding to the incline of the bottom of the film receiver, and a guide for directing the film into the receiver.

22. In combination, a swinging arm carrying a pintle, a film receiver journaled to rotate on said pintle, means to direct the film into the receiver, a support on which the film receiver is adapted to ride during the swinging movement thereof, and means for lowering the support to permit disengagement of the receiver from the pintle.

23. In a moving picture machine, a film receiver having a bottom inclined downward toward the rim thereof, a film guide having the exit end thereof in close relation to the rim of the receiver, means for supporting said receiver and means for maintaining a substantially parallel relation between the guide and the inclined bottom of the receiver as the coil of film in the receiver increases in thickness.

24. In a moving picture machine, a rotatable film receiver having a bottom inclined from the center toward the rim thereof, a guide for directing the film into the receiver, the said guide and receiver having a relatively radial movement one with respect to the other, a support for the receiver and means for maintaining the mouth of the guide closely adjacent to the inclined bottom of the receiver during the radial movement aforesaid.

25. In a moving picture machine, a rotatable film receiver having an annular rim, and means provided by the receiver for causing the film to gravitate toward the rim portion thereof, a support for the receiver, and a guide to direct the film into the receiver.

26. A horizontally disposed rotatable film receiver having the bottom thereof inclined from the center toward the rim, whereby the film as it is coiled in the receiver will gravitate toward the rim and be coiled in a compact mass against said rim, a pivotal support for the receiver, and means to guide the film within the receiver.

27. A horizontally disposed film receiver having a conical bottom whereby the film as it is coiled therein will be caused to gravitate toward the edge portion of the receiver, supporting means for the receiver, and means to direct the film into the receiver.

28. A horizontally disposed film receiver having a conical bottom whereby the film as it is coiled therein will be caused to gravitate toward the edge portion of the receiver, supporting means for the receiver and a guide for directing the film into the receiver.

29. A rotatable receiver for a coil of film, having an inclined bottom adapted to direct the film toward the edge or rim portion of the receiver, a support for the receiver, and means to direct the film into the receiver.

30. A rotatable receiver for a coil of film, having an inclined bottom adapted to direct the film toward the edge or rim portion of the receiver, a support for the receiver, and means for guiding the film into the rim portion of the receiver.

31. In combination with a support for a roll of film, means for imparting feeding motion to the film, a receiver for the film, having a conical bottom, supporting means for the receiver and means for guiding the film into the rim portion of the receiver.

32. A film receiver having an annular gutter at the rim thereof to receive the leading end of a coil of film, a supporting member for the receiver, and guide means for the film.

33. A film receiver having a bottom inclined from the center portion toward the rim thereof and provided with an annular depression at the extreme rim portion thereof, a supporting member for the receiver, and directing means for said film.

34. A film receiver for moving picture machines having a conical bottom terminating in a confining rim, there being provided an annular depression at the base of said rim, means for supporting the receiver, and means to direct the film into the receiver.

35. A film receiver for moving picture machines having a conical bottom for spreading the film out toward the periphery of the same, and being further provided with an annular peripheral depression, supporting means for the receiver, and directing means for said film.

36. The combination with a film receiver, and means for supporting the same, of a guide for directing the film into said receiver, and an adjustable support for said guide whereby the guide may be adjusted with relation to the film receiver so that the film will be properly directed into the receiver.

37. In combination, a substantially cylindrical, horizontally disposed film receiver having an upwardly extending confining rim, inwardly projecting members formed on the rim, a substantially vertical pivot on which said receiver is rotatably engaged, a guide for directing the film into the receiver and into engagement with the rim portion thereof, and the end of the film into engagement with one of said projecting members, and means for holding the film as it is coiled in the receiver outward toward the rim of the receiver to thereby coil the film into a regular compact body.

38. In combination, a substantially cylindrical, horizontally disposed film receiver having an upwardly extending confining rim, a substantially vertical pivot on which said receiver is rotatably engaged, a guide for directing the film into the receiver and into engagement with the rim portion thereof, means for holding the film as it is coiled in the receiver outward toward the rim of the receiver to thereby coil the film into a regular compact body, and means for maintaining a substantially constant relation between the bottom of the receiver and the mouth of the guide as the coil of film in the receiver increases in size.

39. In combination, a substantially cylindrical, horizontally disposed film receiver having a substantially conical bottom inclined downwardly toward the rim thereof and having an upwardly extending confining rim, a substantially vertical pivot on which the receiver is rotatably engaged, a guide for directing the film into the receiver and into engagement with the rim portion thereof, and means for maintaining a substantially constant relation between the bottom of the receiver and the mouth of the guides as the coil of film within the receiver increases in size.

Signed at New York in the county of New York and State of New York this 29th day of March A. D. 1910.

GEORGE W. BINGHAM.

Witnesses:
MABLE SHAW,
PHILIP S. MCLEAN.